United States Patent
Li et al.

(10) Patent No.: US 11,300,401 B2
(45) Date of Patent: Apr. 12, 2022

(54) MULTI-HEAD MEASURING APPARATUS AND MEASURING POINT AUTOMATIC ALLOCATION METHOD THEREOF

(71) Applicant: WUHAN CHINA STAR OPTOELECTRONICS TECHNOLOGY CO., LTD., Hubei (CN)

(72) Inventors: Min Li, Hubei (CN); Zhiwei Yu, Hubei (CN); Min Qiu, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 405 days.

(21) Appl. No.: 16/461,389

(22) PCT Filed: Dec. 25, 2018

(86) PCT No.: PCT/CN2018/123453
§ 371 (c)(1),
(2) Date: May 16, 2019

(87) PCT Pub. No.: WO2019/128981
PCT Pub. Date: Jul. 4, 2019

(65) Prior Publication Data
US 2020/0200524 A1 Jun. 25, 2020

(30) Foreign Application Priority Data
Dec. 27, 2017 (CN) .......................... 201711450322.6

(51) Int. Cl.
*G01B 11/06* (2006.01)
*G02F 1/13* (2006.01)
(Continued)

(52) U.S. Cl.
CPC .......... *G01B 11/0608* (2013.01); *G01B 21/04* (2013.01); *G01B 21/08* (2013.01); *G02F 1/1303* (2013.01)

(58) Field of Classification Search
CPC .... G01B 11/0608; G01B 21/04; G01B 21/08; G02F 1/1303
See application file for complete search history.

(56) References Cited

FOREIGN PATENT DOCUMENTS

CN 102262311 A * 11/2011
CN 203454973 U * 2/2014
(Continued)

*Primary Examiner* — Natalie Huls
*Assistant Examiner* — Cynthia L. Davis
(74) *Attorney, Agent, or Firm* — Mark M. Friedman

(57) ABSTRACT

A measuring point position automatic allocation method for a multi-head measuring apparatus is provided and includes steps as follows: obtaining point position coordinates for all point positions on a surface of a color filter that need measurement, grouping the point position coordinates, matching the Y-axis coordinates of each group with gantry mechanisms corresponding to a measuring range, according to the Y-axis coordinates of the gantry mechanisms matching X-axis coordinates with the measuring head mechanisms, sequentially matching the point position coordinates of all the point positions needing measurement with the gantry mechanisms and the measuring head mechanisms to complete allocation of the point positions.

17 Claims, 5 Drawing Sheets

(51) Int. Cl.
*G01B 21/08* (2006.01)
*G01B 21/04* (2006.01)

(56) References Cited

FOREIGN PATENT DOCUMENTS

| CN | 103673897 | A | * | 3/2014 | ......... G01B 11/0608 |
|----|-----------|---|---|--------|------------------------|
| CN | 105549276 | A | * | 5/2016 | |
| JP | 2007205791 | A | * | 8/2007 | |
| JP | 2008298727 | A | * | 12/2008 | |

* cited by examiner

MULTI-HEAD MEASURING APPARATUS AND MEASURING POINT AUTOMATIC ALLOCATION METHOD THEREOF

FIELD OF INVENTION

The present invention relates to a field of liquid crystal display manufacturing technologies, especially to a multi-head color filter spacer height measurement apparatus and a measuring point automatic allocation method thereof.

BACKGROUND OF INVENTION

During manufacture of liquid crystal displays, a spacer height measuring machine is an important optical measuring machine of a thin film transistor liquid crystal display (TFT-LCD) process, and is mainly configured to measure heights of spacers between an array substrate and a color filter substrate, widths of wires and overlapping conditions.

A cell gap is an important parameter in the TFT-LCD display panel manufacturing process and determines quantity of dropped liquid crystal. Heights of photo spaces directly relate to the cell gap. For precision calculation of dropped quantity of liquid crystals into each display panel, before a color filter substrate product is shipped, measurement is necessarily implemented to heights of spacers on all display panels on a motherboard. There are a great number of display panels with small dimensions and many point positions to be measured. To fulfill a production pace of a production line and requirement of production capacity (fast measurement) and to reduce purchasing quantity of measuring apparatuses (few apparatuses), a spacer height (PSH) measurement apparatus employs a design of multiple heads for simultaneous measurement, and even employs a design of a dual-gantry with a multi-head to reduce measurement time for each display panel, which enhances the production capacity.

A conventional PSH measurement apparatus manually allocates point positions under measurement, for example, a PSH measurement apparatus adopting a design of a dual-gantry with a multi-head, when allocating point positions under measurement to different heads, is bridled by a limitation that heads of each gantry simultaneously performing measurement should ensure Y-axis coordinates thereof are within a deviation range of ±2 mm and a safe distance between adjacent heads and adjacent gantries should be guaranteed. Before measurement, adopted heads for each point position under measurement and measuring order should be planned in advance before measurement, and then each axis is manually moved to a corresponding place to obtain point position coordinates. The point position coordinates are required to be recorded sequentially. Manually allocating the point positions under measurement has existing drawbacks as follows: 1. It is required to adjust the point positions one by one, during the adjusting it is required to assure the safe distance between adjacent heads, and during the adjusting invalid movement exists; 2. Collision of heads easily occurs, which results in crash of the apparatus; 3. Sequential recording is required, which results in repeated operations (for example, 300 point positions under measurement and 8 heads require 38 repeated operations) and time consumption; 4. An operator gets tired easily and results in errors of point position allocation, failure on movement and low use rate of some of the heads.

As described above, the conventional color filter spacer height measurement apparatus, during operation, manually allocates the point positions under measurement, which results in low measuring efficiency, high errors, crash of the apparatus due to errors on data and therefore fail to fulfill demand of designs for production pace and production capacity.

SUMMARY OF INVENTION

Technical Issue

The present invention provides a measuring point position automatic allocation method for a multi-head measuring apparatus that can automatically allocate point positions under measurement to corresponding measuring mechanisms precisely and quickly to solve the technical issue that the conventional color filter spacer height measurement apparatus, during operation, manually allocates the point positions under measurement, which results in low measuring efficiency, high errors, crash of the apparatus due to errors on data and therefore fail to fulfill demand of designs for production pace and production capacity.

Technical Solution

To solve the above technical issue, the present invention provides technical solutions as follows.

The present invention provides a measuring point position automatic allocation method for a multi-head measuring apparatus, the multi-head measuring apparatus configured to measure a spacer height of a surface of a color filter, the multi-head measuring apparatus comprising two gantry mechanisms configured to move along a Y-axis direction, and measuring head mechanisms disposed on each of the gantry mechanisms and configured to move along an X-axis direction; the method comprising:

step S10 comprising obtaining point position coordinates for point positions on the surface of the color filter that need measurement; sorting the point positions according to X-axis coordinates of the point position coordinates from the high to low ones, sorting the point positions according to Y-axis coordinates of the point position coordinates from the high to low ones, and numbering the point positions according to a sorting result;

step S20 comprising grouping the point position coordinates, wherein the point positions with less difference of the Y-axis coordinates are grouped into a group for the gantry mechanisms to measure the point positions simultaneously;

step S30 comprising matching the Y-axis coordinates of each group with the gantry mechanisms within a measuring range, wherein the two gantry mechanisms keep a safe distance therebetween;

step S40 comprising sorting the groups, and preferentially matching the Y-axis coordinate having a higher priority with the gantry mechanisms;

step S50 comprising according to the Y-axis coordinate of the gantry mechanisms, matching the measuring head mechanisms with the X-axis coordinates; wherein the X-axis coordinates matched fulfills that adjacent two of the measuring head mechanisms keep the safe distance; and step S60 comprising sequentially matching the point position coordinates of the point positions needing measurement with the gantry mechanisms and the measuring head mechanisms to complete allocation of measuring point positions.

According to a preferred embodiment of the present invention, the step S30 specifically comprises:

step S301 comprising determining group by group whether non-matched one of the groups is within the measuring range of a first gantry mechanism;

if no, continuing matching until the point position coordinates of the group are matched with the measuring range of the first gantry mechanism;

if yes, matching the first gantry mechanism with the Y-axis coordinate comprising the highest priority;

step S302 comprising determining group by group whether non-matched one of the groups is within the measuring range of a second gantry mechanism;

if no, continuing matching until the point position coordinates of the group are matched with the measuring range of the second gantry mechanism;

if yes, matching the second gantry mechanism with the Y-axis coordinate comprising the highest priority.

According to a preferred embodiment of the present invention, in the step S301, when matching continues but none of the groups of the point position coordinates is matched with the measuring range of the first gantry mechanism, the point positions are not measured by the first gantry mechanism, the measuring head mechanisms on the first gantry mechanism employ predetermined safe coordinates; and in the step S302, when matching continues but none of the groups of the point position coordinates is matched with the measuring range of the second gantry mechanism, the point positions are not measured by the second gantry mechanism, the measuring head mechanisms on the second gantry mechanism employ predetermined safe coordinates.

According to a preferred embodiment of the present invention, the step S60 further comprises:

determining whether the X-axis coordinates have been matched completely;

if yes, returning to the step S301;

if no, returning to the step S50 to continue allocating the X-axis coordinates not matched yet.

According to a preferred embodiment of the present invention, the step S50 further comprises:

step S501 comprising according to a Y-axis coordinate of the first gantry mechanism, matching X-axis coordinates to the measuring head mechanisms disposed on the first gantry mechanism; and step S502 comprising according to a Y-axis coordinate of the second gantry mechanism, matching X-axis coordinates to the measuring head mechanisms disposed on the second gantry mechanism.

According to a preferred embodiment of the present invention, the step S501 specifically comprises:

sequentially determining whether each of the point positions matched with the measuring head mechanisms on the first gantry mechanism is within a moving range set in corresponding one of the measuring head mechanisms;

if yes, matching the point position coordinate of the point position with corresponding one of the measuring head mechanisms for measurement;

if no, continuing matching until the point position coordinate of the point position is matched with the moving range set in the measuring head mechanisms; and the step S502 specifically comprises:

sequentially determining whether each of the point positions matched with the measuring head mechanisms on the second gantry mechanism is within a moving range set in corresponding one of the measuring head mechanisms;

if yes, matching the point position coordinate of the point position with corresponding one of the measuring head mechanisms for measurement;

if no, continuing matching until the point position coordinate of the point position is matched with the moving range set in the measuring head mechanism.

According to a preferred embodiment of the present invention, in the step S501 and the step S502, when matching continues but none of the point position coordinates is matched with the moving ranges set in the measuring head mechanisms, the point positions are not measured by the measuring head mechanisms, and the measuring head mechanism employ predetermined safe coordinates.

According to a preferred embodiment of the present invention, in the step S20, each of coordinate difference values among the point positions of each group is less than a limit value of the measuring head mechanisms on each gantry mechanisms along the Y-axis, and the limit value is ±2 mm.

The present invention also provides a measuring point position automatic allocation method for a multi-head measuring apparatus, the multi-head measuring apparatus configured to measure a spacer height of a surface of a color filter, the multi-head measuring apparatus comprising two gantry mechanisms configured to move along a Y-axis direction, and measuring head mechanisms disposed on each of the gantry mechanisms and configured to move along a an X-axis direction; the method comprising:

step S10 comprising obtaining point position coordinates for point positions on the surface of the color filter that need measurement;

step S20 comprising grouping the point position coordinates, wherein the point positions with less difference of the Y-axis coordinates are grouped into a group for the gantry mechanisms to measure the point positions simultaneously;

step S30 comprising matching the Y-axis coordinates of each group with the gantry mechanisms within a measuring range, wherein the two gantry mechanisms keep a safe distance therebetween;

step S40 comprising sorting the groups, and preferentially matching the Y-axis coordinate having a higher priority with the gantry mechanisms;

step S50 comprising according to the Y-axis coordinate of the gantry mechanisms, matching the measuring head mechanisms with the X-axis coordinates; wherein the X-axis coordinates matched fulfills that adjacent two of the measuring head mechanisms keep the safe distance; and step S60 comprising sequentially matching the point position coordinates of the point positions needing measurement with the gantry mechanisms and the measuring head mechanisms to complete allocation of measuring point positions.

According to a preferred embodiment of the present invention, the step S30 specifically comprises:

step S301 comprising determining group by group whether non-matched one of the groups is within the measuring range of a first gantry mechanism;

if no, continuing matching until the point position coordinates of the group are matched with the measuring range of the first gantry mechanism;

if yes, matching the first gantry mechanism with the Y-axis coordinate comprising the highest priority;

step S302 comprising determining group by group whether non-matched one of the groups is within the measuring range of a second gantry mechanism;

if no, continuing matching until the point position coordinates of the group are matched with the measuring range of the second gantry mechanism;

if yes, matching the second gantry mechanism with the Y-axis coordinate comprising the highest priority.

According to a preferred embodiment of the present invention, in the step S301, when matching continues but none of the groups of the point position coordinates is matched with the measuring range of the first gantry mechanism, the point positions are not measured by the first gantry mechanism, the measuring head mechanisms on the first gantry mechanism employ predetermined safe coordinates; and in the step S302, when matching continues but none of the groups of the point position coordinates is matched with the measuring range of the second gantry mechanism, the point positions are not measured by the second gantry mechanism, the measuring head mechanisms on the second gantry mechanism employ predetermined safe coordinates.

According to a preferred embodiment of the present invention, the step S60 further comprises:

determining whether the X-axis coordinates have been matched completely;

if yes, returning to the step S301;

if no, returning to the step S50 to continue allocating the X-axis coordinates not matched yet.

According to a preferred embodiment of the present invention, the step S50 further comprises:

step S501 comprising according to a Y-axis coordinate of the first gantry mechanism, matching X-axis coordinates to the measuring head mechanisms disposed on the first gantry mechanism; and step S502 comprising according to a Y-axis coordinate of the second gantry mechanism, matching X-axis coordinates to the measuring head mechanisms disposed on the second gantry mechanism.

According to a preferred embodiment of the present invention, the step S501 specifically comprises:

sequentially determining whether each of the point positions matched with the measuring head mechanisms on the first gantry mechanism is within a moving range set in corresponding one of the measuring head mechanisms;

if yes, matching the point position coordinate of the point position with corresponding one of the measuring head mechanisms for measurement;

if no, continuing matching until the point position coordinate of the point position is matched with the moving range set in the measuring head mechanisms; and the step S502 specifically comprises:

sequentially determining whether each of the point positions matched with the measuring head mechanisms on the second gantry mechanism is within a moving range set in corresponding one of the measuring head mechanisms;

if yes, matching the point position coordinate of the point position with corresponding one of the measuring head mechanisms for measurement;

if no, continuing matching until the point position coordinate of the point position is matched with the moving range set in the measuring head mechanism.

According to a preferred embodiment of the present invention, in the step S501 and the step S502, when matching continues but none of the point position coordinates is matched with the moving ranges set in the measuring head mechanisms, the point positions are not measured by the measuring head mechanisms, and the measuring head mechanism employ predetermined safe coordinates.

According to a preferred embodiment of the present invention, in the step S20, each of coordinate difference values among the point positions of each group is less than a limit value of the measuring head mechanisms on each gantry mechanisms along the Y-axis, and the limit value is ±2 mm.

According to the above objective of the present invention, a multi-head measuring device is provided and configured to measure heights of spacers on a surface of a color filter, wherein the device comprises:

a point position coordinates obtaining unit, configured to obtain point position coordinates for point positions on surface of the color filter that need measurement;

a grouping unit, configured to group the point position coordinates, wherein the point positions with less difference of the Y-axis coordinates are grouped into a group for the gantry mechanisms to measure the point positions simultaneously;

a Y-axis coordinate matching unit, configured to match the Y-axis coordinates of each group with the gantry mechanisms within a measuring range, wherein the two gantry mechanisms keep a safe distance therebetween; and an X-axis coordinate matching unit, configured to, according to the Y-axis coordinate of the gantry mechanisms, match the measuring head mechanisms with the X-axis coordinates; wherein the X-axis coordinates matched fulfills that adjacent two of the measuring head mechanisms keep the safe distance.

Advantages

The measuring point position automatic allocation method for a multi-head measuring apparatus provided by the present invention can automatically allocate point positions under measurement with corresponding measuring mechanisms precisely and quickly and can assure adjacent measuring mechanisms to operate in a safe distance to avoid collision of the measuring mechanism to result in crash of the apparatus. The method solves the technical issue that the conventional color filter spacer height measurement apparatus, during operation, manually allocates the point positions under measurement, which results in low measuring efficiency, high errors, crash of the apparatus due to errors on data and therefore fail to fulfill demand of designs for production pace and production capacity.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DETAILED DESCRIPTION OF PREFERRED EMBODIMENTS

Figure 1:
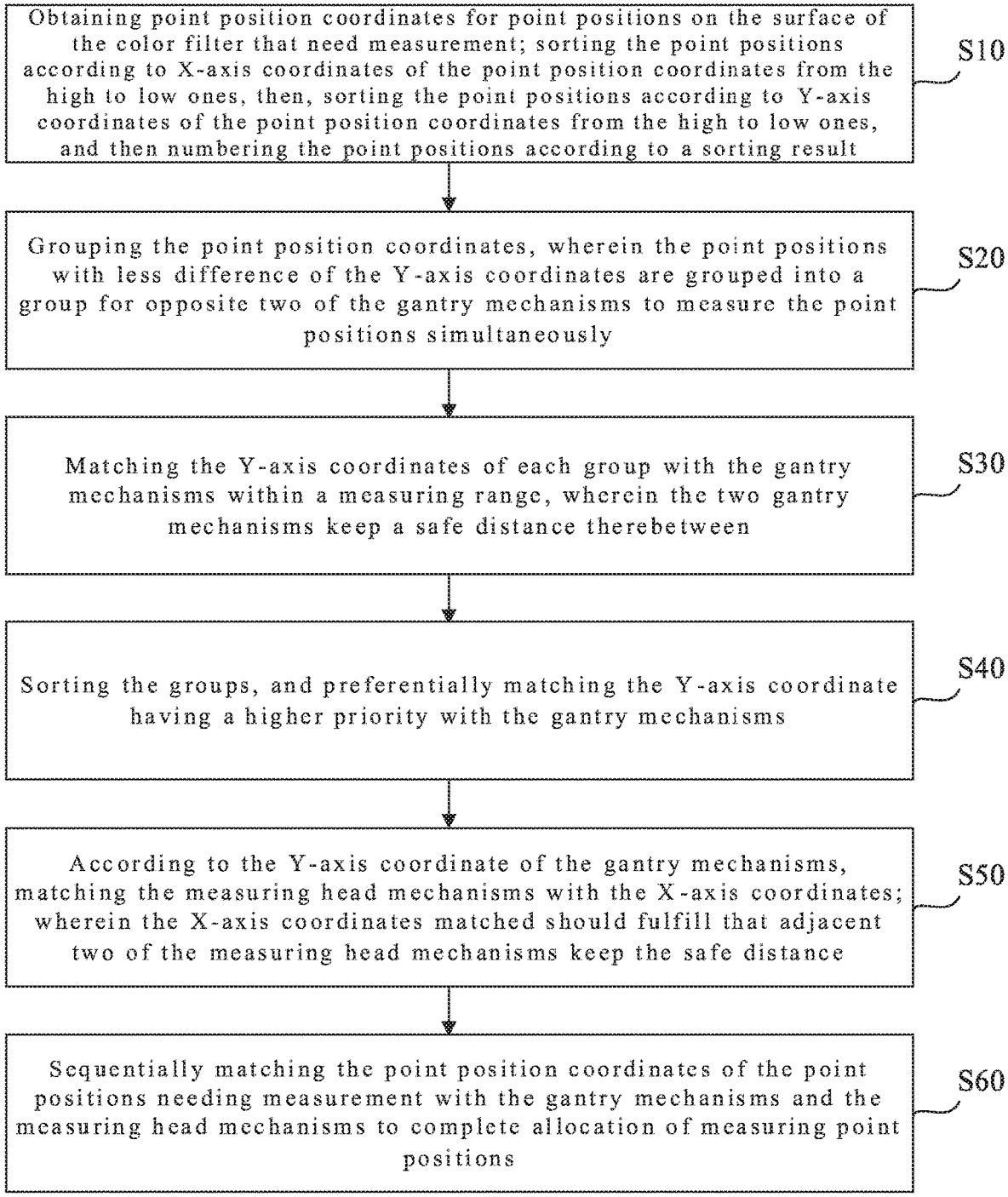
FIG. 1 is a flowchart of a measuring point position automatic allocation method for a multi-head measuring apparatus of an embodiment 1 provided by the present invention.

Each of the following embodiments is described with appending figures to illustrate specific embodiments of the present invention that are applicable. The terminologies of direction mentioned in the present invention, such as "upper", "lower", "front", "rear", "left", "right", "inner", "outer", "side surface", etc., only refer to the directions of the appended figures. Therefore, the terminologies of direction are used for explanation and comprehension of the present invention, instead of limiting the present invention. In the figures, units with similar structures are marked with the same reference characters.

The present invention aims at the technical issue that a conventional color filter spacer height measurement apparatus, during operation, manually allocates the point positions under measurement, which results in low measuring efficiency, high errors, crash of the apparatus due to errors on data and therefore fail to fulfill demand of designs for production pace and production capacity, the present invention can solve the above defects.

Embodiment 1

The embodiment 1 will be further analyzed and described accompanying with the drawings as follows.

FIG. 1 shows a flowchart of a measuring point position automatic allocation method for a multi-head measuring apparatus provided by the present invention, which is described in details as follows.

Figure 3:
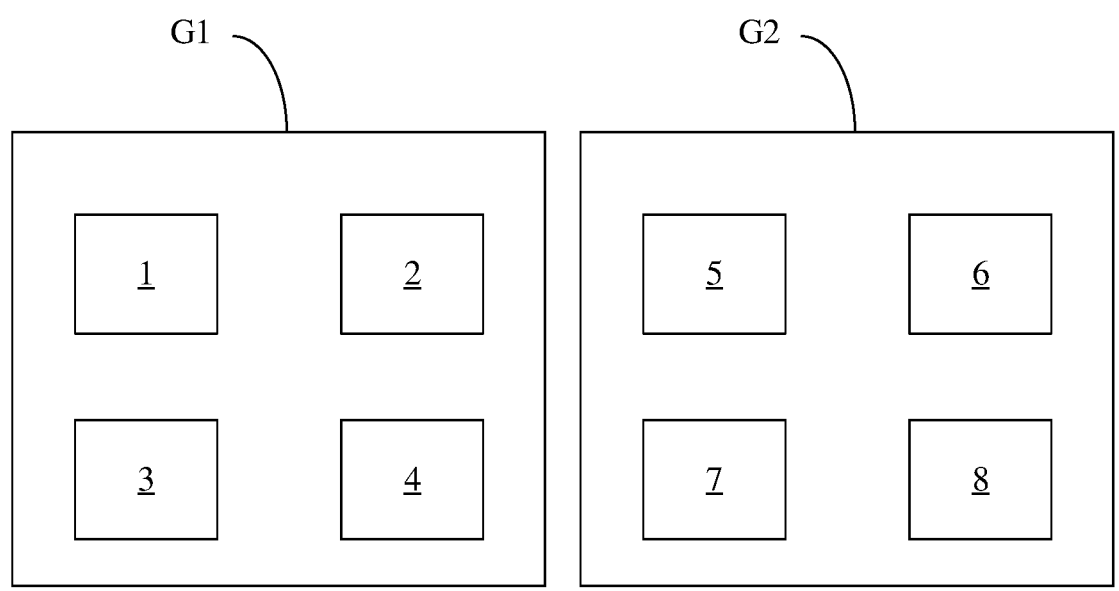
FIG. 3 is a block diagram of gantry mechanisms and measuring head mechanisms of the present invention.

With further reference to FIG. 3, the multi-head measuring apparatus includes two gantry mechanisms configured to move along a Y-axis direction, and measuring head mechanism disposed on each of the gantry mechanisms and configured to move along an X-axis direction. For example, the multi-head measuring apparatus includes a first gantry mechanism G1 and a second gantry mechanism G2, a first measuring head mechanism head 1, a second measuring head mechanism head 2, a third measuring head mechanism head 3, a fourth measuring head mechanism head 4, a fifth measuring head mechanism head 5, a sixth measuring head mechanism head 6, a seventh measuring head mechanism head 7, and an eighth measuring head mechanism head 8. Then logics are as follows:

Gantry (gantry mechanism): movement along the Y-axis

Gantry quantity: 2 (a=1-2)

Gantry safe distance: b

Gantry moving range:

G1→(Y1s-Y1e)Y1s>Y1e;

G2→(Y2s-Y2e)Y2s>Y2e;

Y1s>Y2s>0>Y1e>Y2e head (measuring head mechanism): movement along the X-axis head quantity: 8 (c=1-8), the head 1-head 4 are disposed on the Gantry1, the head 5-head 8 are disposed on the Gantry2, a range of a difference value of the heads 1-4 along the Y-axis is h=±2 mm, a range of a difference value of the heads 5-8 along the Y-axis is h=±2 mm;

head safe distance: d head moving range:

head 1→(X1s-X1e, Y1s-Y1e)X1s>X1e;

head 2→(X2s-X2e, Y1s-Y1e)X2s>X2e;

head 3→(X3s-X3e, Y1s-Y1e)X3>X3e;

head 4→(X4s-X4e, Y1s-Y1e)X4s>X4e;

X1s>X2s>X3s>X4s>0>X1e>X2e>X3e>X4e;

head 5→(X5s-X5e, Y2s-Y2e)X5s>X5e;

head 6→(X6s-X6e, Y2s-Y2e)X6s>X6e;

head 7→(X7s-X7e, Y2s-Y2e)X7s>X7e;

head 8→(X8s-X8e, Y2s-Y2e)X8s>X8e;

X5s>X6s>X7s>X8s>0>X5e>X6e>X7e>X8e.

A step S10 includes obtaining point position coordinates for point positions on the surface of the color filter that need measurement.

For example, the surface of the color filter includes n point positions under measurement, and point position coordinates include:

(x1, y1), (x2, y2), . . . , (xn, yn), x values of the point position coordinates are sorted from a largest one to a smallest one, and then y values of the point position coordinates are sorted a largest one to a smallest one, i.e., y1≤y2≤ . . . ≤yn.

Therefore, a number set of the x values is f(x):{x1, x2, . . . , xi, . . . , xj, . . . , xn}, (X4e<f(x)<X1s, or X8e<f(x)<X5s).

Therefore, a number set of the y values is f(y):{y1, y2, . . . , yi, . . . , yj, . . . , yn}, (Y2e<f(y)<Y1s).

A step S20 includes grouping the point position coordinates, wherein the point positions with less difference of the Y-axis coordinates are grouped into a group for the gantry mechanisms to measure the point positions simultaneously.

The coordinates are grouped. Y coordinates having a difference within ±2 mm are grouped into a group. If m groups are built, then m≤n:

Y1: if former i coordinates are grouped into a Y1 group, then i=countif (y1-f(y), "≤4");

Y2: if former i+1-j coordinates are grouped into a Y2 group, then j=countif (yi+1-f(y), "≤4")+i

. . .

Yk: it is assumed that there is one coordinate grouped into a Yk group, (a calculation method thereof is as above)

. . .

Ym: (a calculation method thereof is as above).

A step S30 includes matching the Y-axis coordinates of each group with the gantry mechanisms within a measuring range, wherein the two gantry mechanisms keep a safe distance therebetween. Specifically:

A first group of the point positions are matched:

1. It is determined whether Y1s>Y1>Y1e is true, if yes, then the Y1 group is measured by the G1 (gantry 1); if no, then it is continued to determine whether Y1s>Y(m)>Y1e, (m=1, 2, . . . , m) is true until a first group of Y coordinates $Y_{G1\text{-}1}$ are matched with the G1; if none of the Y coordinates is matched with the G1, then the point positions are not measured by the G1, and all the heads 1-4 employ predetermined safe coordinates.

2. The Y coordinates matched with the G1 in the first step are removed. It is determined whether Y2s>Y(m)>Y2e& |$Y_G$1-1-Y(m)|>b, (m=1, 2, . . . , m) is true until a first group of Y coordinates $Y_{G2\text{-}1}$ are matched with the G2; if none of the Y coordinate $Y_{G2\text{-}1}$ is matched with the G2, then the point positions are not measured by the G2, and all the head 5-8 employ predetermined safe coordinates.

A step S40 includes sorting according to the groups, and match the Y-axis coordinates with the gantry mechanisms from the Y-axis coordinate including a highest priority.

A step S50 includes according to the Y-axis coordinates of the gantry mechanisms, matching the X-axis coordinates with the measuring head mechanisms; the X-axis coordinate to be matched are required to fulfill a safe distance kept between the measuring head mechanism adjacent to each other.

For example, $Y_{G1-1}=Y1$, $Y_{G2-1}=Yk$, the point positions under measurement are allocated to each head:

A first step includes according to steps (1)-(4) using the heads 1-4 to select corresponding X values in the Y1 group for matching, and according to steps (5)-(8) using the heads 5-8 to select corresponding X values in the Yk group for matching;

The step (1) includes sequentially determining whether X1s>xi>X1e, (i=1, 2, . . . , i) is true, if yes, allocating corresponding point positions to the head 1, if not, matching continues until a first point position (X1-1, Y1-1) under measurement is matched with the head 1; if none of the point positions is matched with the head 1, the point positions are not measured by the head 1, the X value of the head 1 employs a predetermined safe coordinate, and the Y value of the head 1 employs Y1;

The step (2) includes removing the matched point positions in the Y1 group, sequentially determining whether X2s>xi>X2e&X1-1-xi>d (i=1, 2, . . . , i) is true, if yes, corresponding point positions are matched with the head 2 for measurement, if no, matching continues until a first point position (X2-1, Y2-1) under measurement is matched with the head 2; if none of the point positions is matched with the head 2, the point positions are not measured by the head 2, the X value of the head 2 employs a predetermined safe coordinate, and the Y value of the head 2 employs Y1;

The step (3) includes removing the matched point positions in the Y1 group, sequentially determining whether X3s>xi>X3e & X2-1-xi>d (i=1, 2, . . . , i) is true, if yes, corresponding point positions are matched with the head 3 for measurement, if no, matching continues until a first point position (X3-1, Y3-1) under measurement is matched with the head 3; if none of the point positions is matched with the head 3, the point positions are not measured by the head 3, the X value of the head 3 employs a predetermined safe coordinate, and the Y value of the head 3 employs Y1;

The step (4) includes removing the matched point positions in the Y1 group, sequentially determining whether X4s>xi>X4e&X3-1-xi>d (i=1, 2, . . . , i) is true, if yes, corresponding point positions are matched with the head 4 for measurement, if no, matching continues until a first point position (X4-1, Y4-1) under measurement is matched with the head 4; if none of the point positions is matched with the head 4, the point positions are not measured by the head 4, the X value of the head 4 employs a predetermined safe coordinate, and the Y value of the head 4 employs Y1;

The step (5) includes sequentially determining whether X5s>xk>X5e, (i=k-l, . . . k-1, k, it is assumed that yk-l-yk is in a Yk group) is true, if yes, corresponding point positions are matched with the head 5 for measurement, if no, matching continues until a first point position (X5-1, Y5-1) under measurement is matched with the head 5; if none of the point positions is matched with the head 5, the point positions are not measured by the head 5, the X value of the head 5 employs a predetermined safe coordinate, and the Y value of the head 5 employs Yk;

The step (6) includes removing the matched point positions in the Yk group, sequentially determining whether X6s>xk>X6e & X5-1-xk>d (i=k-l, . . . k-1, k, it is assumed that yk-l-yk is in the Yk group) is true, if yes, corresponding point positions are matched with the head 6 for measurement, if no, matching continues until a first point position (X6-1, Y6-1) under measurement is matched with the head 6; if none of the point positions is matched with the head 6, the point positions are not measured by the head 6, the X value of the head 6 employs a predetermined safe coordinate, and the Y value of the head 6 employs Yk;

The step (7) includes removing the matched point positions in the Yk group, sequentially determining whether X7s>xk>X7e & X6-1-xk>d (i=k-l . . . k-1, k, it is assumed that yk-l-yk is in the Yk group) is true, if yes, corresponding point positions are matched with the head 7 for measurement, if no, matching continues until a first point position (X7-1, Y7-1) under measurement is matched with the head 7; if none of the point positions is matched with the head 7, the point positions are not measured by the head 7, the X value of the head 7 employs a predetermined safe coordinate, and the Y value of the head 7 employs Yk;

The step (8) includes removing the matched point positions in the Yk group, sequentially determining whether X8s>xk>X8e & X7-1-xk>d (i=k-l . . . k-1, k, it is assumed that yk-l-yk is in the Yk group) is true, if yes, corresponding point positions are matched with the head 8 for measurement, if no, matching continues until a first point position (X8-1, Y8-1) under measurement is matched with the head 4; if none of the point positions is matched with the head 8, the point positions are not measured by the head 8, the X value of the head 8 employs a predetermined safe coordinate, and the Y value of the head 8 employs Yk;

A second step includes according to the steps (1)-(4) of the first step, continuing to use the heads 1-4 to select rest of the X values in the Y1 group for matching, and according to the steps (5)-(8), using the heads 5-8 to select rest of the X values in the Yk group;

A third step: . . .

. . .

Continuing matching until data in the Y1 group and the Yk group are matched completely . . .

a second set of point position match:

according to the above steps 1 and 2, matching the rest of the groups;

a third set of point position match:

. . .

After all the point positions are matched completed, generating an allocation formula corresponding to the point positions.

A step S60 includes sequentially matching the point position coordinates of the point positions needing measurement with the gantry mechanisms and the measuring head mechanisms to complete allocation of measuring point positions.

Embodiment 2

Figure 2:
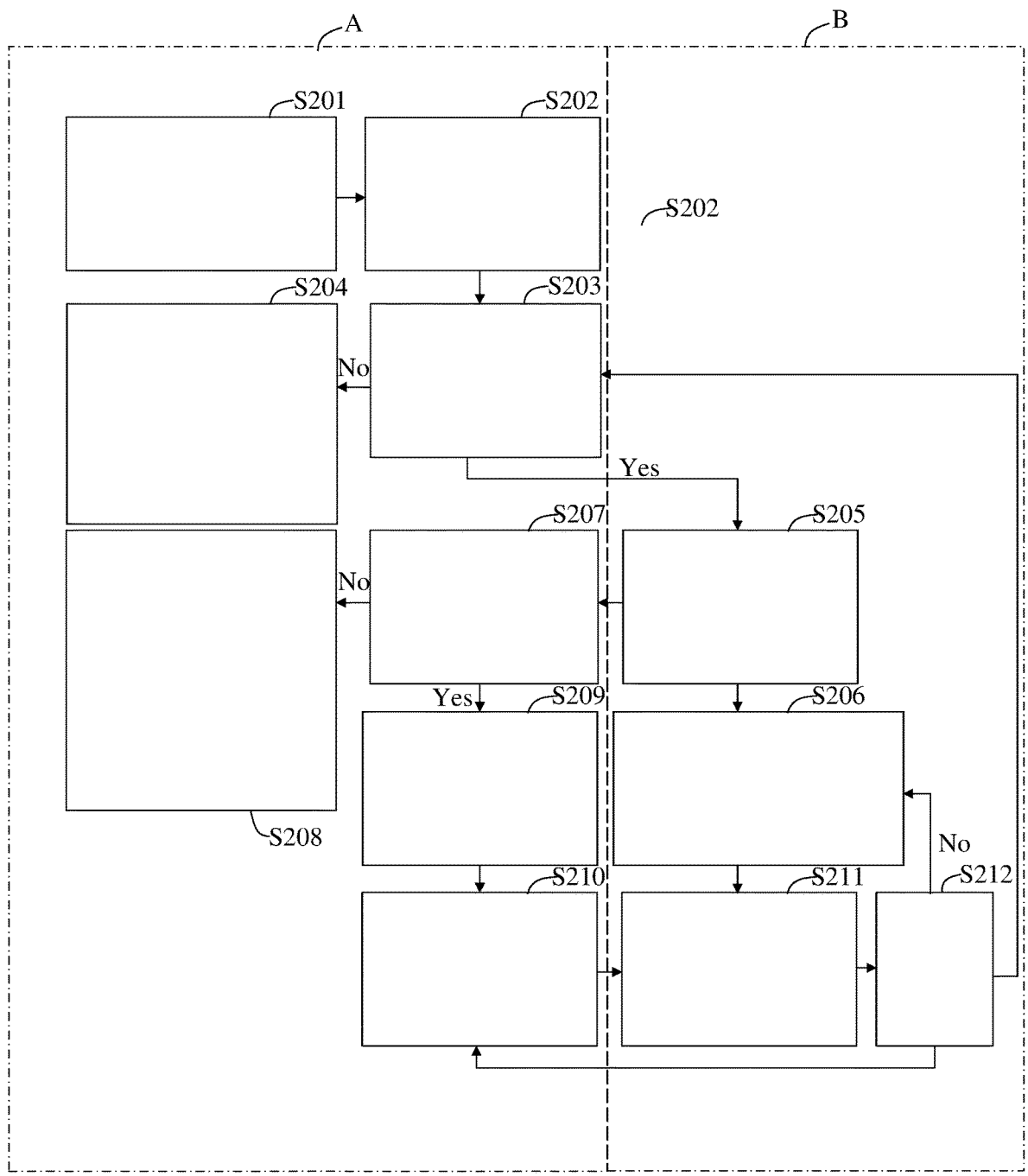
FIG. 2 is a flowchart of a measuring point position automatic allocation method for a multi-head measuring apparatus of an embodiment 2 provided by the present invention, wherein text in each block is omitted.
Figure 2A:
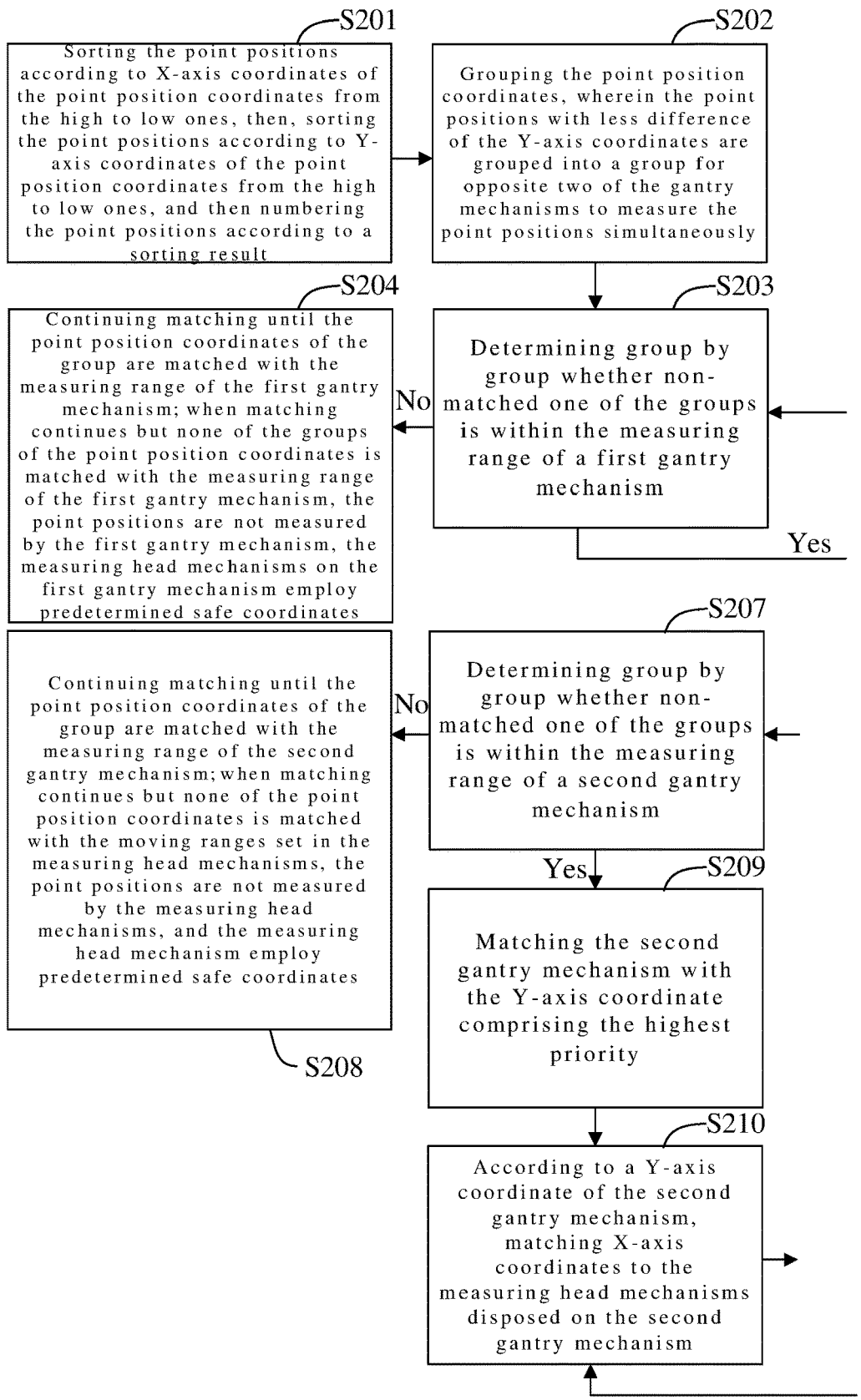
FIG. 2A is a partially enlarged view of the flowchart corresponding to a region A in FIG. 2.
Figure 2B:
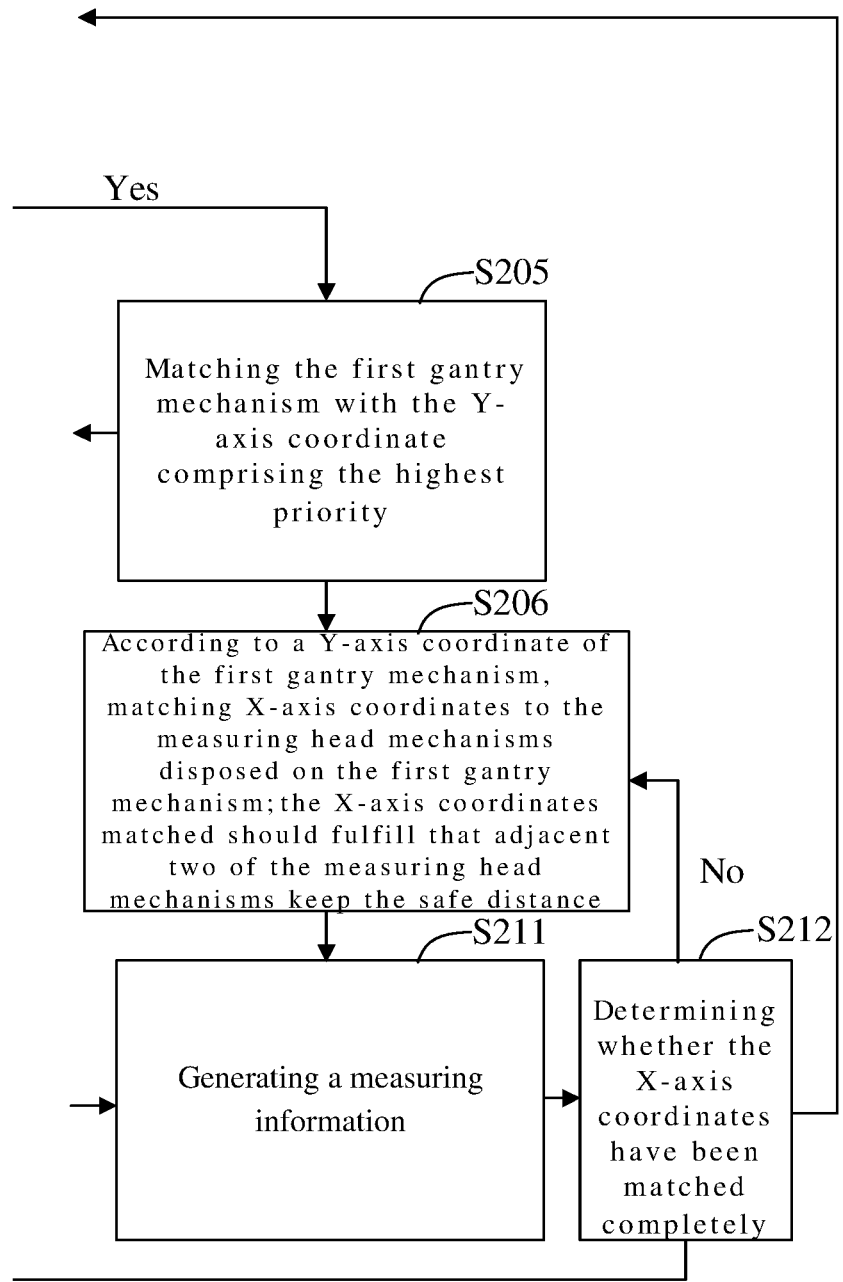
FIG. 2B is another partially enlarged view of the flowchart corresponding to a region B in FIG. 2.

FIG. 2A shows a flowchart of the measuring point position automatic allocation method for a multi-head measuring apparatus provided by the present invention, which is described in details as follows.

The present invention provides a measuring point position automatic allocation method for a multi-head measuring apparatus. The multi-head measuring apparatus is configured to measure a spacer height of a surface of a color filter, the multi-head measuring apparatus includes two gantry mechanisms configured to move along a Y-axis direction, and measuring head mechanisms disposed on each of the gantry mechanisms and configured to move along an X-axis direction. The method includes steps as follows.

A step S201 includes sorting the point positions according to X-axis coordinates of the point position coordinates from the high to low ones, then, sorting the point positions according to Y-axis coordinates of the point position coordinates from the high to low ones, and then numbering the point positions according to a sorting result.

A step S202 includes grouping the point position coordinates, wherein the point positions with less difference of the Y-axis coordinates are grouped into a group for the gantry mechanisms to measure the point positions simultaneously.

A step S203 includes determining group by group whether non-matched one of the groups is within the measuring range of a first gantry mechanism.

A step S204 includes if no, continuing matching until the point position coordinates of the group are matched with the measuring range of the first gantry mechanism; when matching continues but none of the groups of the point position coordinates is matched with the measuring range of the first gantry mechanism, the point positions are not measured by the first gantry mechanism, the measuring head mechanisms on the first gantry mechanism employ predetermined safe coordinates; step S205, if yes, matching the first gantry mechanism with the Y-axis coordinate comprising the highest priority.

A step S206 includes according to a Y-axis coordinate of the first gantry mechanism, matching X-axis coordinates to the measuring head mechanisms disposed on the first gantry mechanism; the X-axis coordinates matched fulfills that adjacent two of the measuring head mechanisms keep the safe distance.

A step S207 includes determining group by group whether non-matched one of the groups is within the measuring range of a second gantry mechanism.

A step S208 includes if no, continuing matching until the point position coordinates of the group are matched with the measuring range of the second gantry mechanism; when matching continues but none of the point position coordinates is matched with the moving ranges set in the measuring head mechanisms, the point positions are not measured by the measuring head mechanisms, and the measuring head mechanism employ predetermined safe coordinates; step S209, if yes, matching the second gantry mechanism with the Y-axis coordinate comprising the highest priority.

A S210 includes according to a Y-axis coordinate of the second gantry mechanism, matching X-axis coordinates to the measuring head mechanisms disposed on the second gantry mechanism.

A S211 includes generating a measuring information.

A S212 includes determining whether the X-axis coordinates have been matched completely; if yes, returning to the step S203; if no, returning to the step S206, S210 to continue allocating the X-axis coordinates not matched yet.

According the above objective of the present invention, a multi-head measuring device is provided and is configured to measure heights of spacers on a surface of a color filter, the device includes: a point position coordinates obtaining unit, configured to obtain point position coordinates for point positions on surface of the color filter that need measurement; a grouping unit, configured to group the point position coordinates, wherein the point positions with less difference of the Y-axis coordinates are grouped into a group for the gantry mechanisms to measure the point positions simultaneously; a Y-axis coordinate matching unit, configured to match the Y-axis coordinates of each group with the gantry mechanisms within a measuring range, wherein the two gantry mechanisms keep a safe distance therebetween; and an X-axis coordinate matching unit, configured to, according to the Y-axis coordinate of the gantry mechanisms, match the measuring head mechanisms with the X-axis coordinates; wherein the X-axis coordinates matched fulfills that adjacent two of the measuring head mechanisms keep the safe distance.

Advantages of the present invention are as follows. The measuring point position automatic allocation method for a multi-head measuring apparatus provided by the present invention can automatically allocate point positions under measurement with corresponding measuring mechanisms precisely and quickly and can assure adjacent measuring mechanisms to operate in a safe distance to avoid collision of the measuring mechanism to result in crash of the apparatus. The method solves the technical issue that the conventional color filter spacer height measurement apparatus, during operation, manually allocates the point positions under measurement, which results in low measuring efficiency, high errors, crash of the apparatus due to errors on data and therefore fail to fulfill demand of designs for production pace and production capacity.

Although the preferred embodiments of the present invention have been disclosed as above, the aforementioned preferred embodiments are not used to limit the present invention. The person of ordinary skill in the art may make various changes and modifications without departing from the spirit and scope of the present invention. Therefore, the scope of protection of the present invention is defined by the scope of the claims.

What is claimed is:

1. A measuring point position automatic allocation method for a multi-head measuring apparatus, the multi-head measuring apparatus configured to measure a spacer height of a surface of a color filter, the multi-head measuring apparatus comprising two gantry mechanisms configured to move along a Y-axis direction, and measuring head mechanisms disposed on each of the gantry mechanisms and configured to move along an X-axis direction; the method comprising:

step S10 comprising obtaining point position coordinates for point positions on the surface of the color filter that need measurement; sorting the point positions according to a descending order of X-axis coordinates of the point position coordinates, sorting the point positions according to a descending order of Y-axis coordinates of the point position coordinates, and numbering the point positions according to a sorting result;

step S20 comprising grouping the point position coordinates, wherein the point positions with a smallest difference of the Y-axis coordinates are grouped into a group for the gantry mechanisms to measure the point positions simultaneously;

step S30 comprising matching the Y-axis coordinates of each group with the gantry mechanisms within a measuring range, wherein the two gantry mechanisms keep a safe distance therebetween;

step S40 comprising sorting the groups and matching the Y-axis coordinate having a priority with the gantry mechanisms;

step S50 comprising according to the Y-axis coordinate of the gantry mechanisms, matching the measuring head mechanisms with the X-axis coordinates; wherein the matching X-axis coordinates fulfills that adjacent two of the measuring head mechanisms keep the safe distance; and step S60 comprising sequentially matching the point position coordinates of the point positions needing measurement with the gantry mechanisms and the measuring head mechanisms to complete allocation of measuring point positions.

2. The method as claimed in claim 1, wherein the step S30 specifically comprises:
step S301 comprising determining group by group whether a non-matched one of the groups is within the measuring range of a first gantry mechanism;
if no, continuing matching until the point position coordinates of the group are matched with the measuring range of the first gantry mechanism;
if yes, matching the first gantry mechanism with the Y-axis coordinate comprising the highest priority;
step S302 comprising determining group by group whether a non-matched one of the groups is within the measuring range of a second gantry mechanism;
if no, continuing matching until the point position coordinates of the group are matched with the measuring range of the second gantry mechanism;
if yes, matching the second gantry mechanism with the Y-axis coordinate comprising the highest priority.

3. The method as claimed in claim 2, wherein
in the step S301, when matching continues but none of the groups of the point position coordinates is matched with the measuring range of the first gantry mechanism, the point positions are not measured by the first gantry mechanism, the measuring head mechanisms on the first gantry mechanism employ predetermined safe coordinates; and
in the step S302, when matching continues but none of the groups of the point position coordinates is matched with the measuring range of the second gantry mechanism, the point positions are not measured by the second gantry mechanism, the measuring head mechanisms on the second gantry mechanism employ predetermined safe coordinates.

4. The method as claimed in claim 2, wherein the step S60 further comprises:
determining whether the X-axis coordinates have been matched completely;
if yes, returning to the step S301;
if no, returning to the step S50 to continue allocating the X-axis coordinates not matched yet.

5. The method as claimed in claim 1, wherein the step S50 further comprises:
step S501 comprising according to a Y-axis coordinate of the first gantry mechanism, matching X-axis coordinates to the measuring head mechanisms disposed on the first gantry mechanism; and
step S502 comprising according to a Y-axis coordinate of the second gantry mechanism, matching X-axis coordinates to the measuring head mechanisms disposed on the second gantry mechanism.

6. The method as claimed in claim 5, wherein
the step S501 specifically comprises:
sequentially determining whether each of the point positions matched with the measuring head mechanisms on the first gantry mechanism is within a moving range set in corresponding one of the measuring head mechanisms;
if yes, matching the point position coordinate of the point position with corresponding one of the measuring head mechanisms for measurement;
if no, continuing matching until the point position coordinate of the point position is matched with the moving range set in the measuring head mechanisms; and
the step S502 specifically comprises:
sequentially determining whether each of the point positions matched with the measuring head mechanisms on the second gantry mechanism is within a moving range set in corresponding one of the measuring head mechanisms;
if yes, matching the point position coordinate of the point position with corresponding one of the measuring head mechanisms for measurement;
if no, continuing matching until the point position coordinate of the point position is matched with the moving range set in the measuring head mechanism.

7. The method as claimed in claim 6, wherein in the step S501 and the step S502, when matching continues but none of the point position coordinates is matched with the moving ranges set in the measuring head mechanisms, the point positions are not measured by the measuring head mechanisms, and the measuring head mechanism employ predetermined safe coordinates.

8. The method as claimed in claim 1, wherein in the step S20, each of coordinate difference values among the point positions of each group is less than a limit value of the measuring head mechanisms on each gantry mechanisms along the Y-axis, and the limit value is ±2 millimeters (mm).

9. A measuring point position automatic allocation method for a multi-head measuring apparatus, the multi-head measuring apparatus configured to measure a spacer height of a surface of a color filter, the multi-head measuring apparatus comprising gantry mechanisms configured to move along a Y-axis direction, and measuring head mechanisms disposed on each of the gantry mechanisms and configured to move along an X-axis direction; the method comprising:
step S10 comprising obtaining point position coordinates for point positions on the surface of the color filter that need measurement;
step S20 comprising grouping the point position coordinates, wherein the point positions with a smallest difference of the Y-axis coordinates are grouped into a group for the gantry mechanisms to measure the point positions simultaneously;
step S30 comprising matching the Y-axis coordinates of each group with the gantry mechanisms within a measuring range, wherein the two gantry mechanisms keep a safe distance therebetween;
step S40 comprising sorting the groups, and matching the Y-axis coordinate having a priority with the gantry mechanisms;
step S50 comprising according to the Y-axis coordinate of the gantry mechanisms, matching the measuring head mechanisms with the X-axis coordinates; wherein the matching X-axis coordinates fulfills that adjacent two of the measuring head mechanisms keep the safe distance; and
step S60 comprising sequentially matching the point position coordinates of the point positions needing measurement with the gantry mechanisms and the measuring head mechanisms to complete allocation of measuring point positions.

10. The method as claimed in claim 9, wherein the step S30 specifically comprises:
step S301 comprising determining group by group whether a non-matched one of the groups is within the measuring range of a first gantry mechanism;
if no, continuing matching until the point position coordinates of the group are matched with the measuring range of the first gantry mechanism;
if yes, matching the first gantry mechanism with the Y-axis coordinate comprising the highest priority;

step S302 comprising determining group by group whether a non-matched one of the groups is within the measuring range of a second gantry mechanism;

if no, continuing matching until the point position coordinates of the group are matched with the measuring range of the second gantry mechanism;

if yes, matching the second gantry mechanism with the Y-axis coordinate comprising the highest priority.

11. The method as claimed in claim 10, wherein in the step S301, when matching continues but none of the groups of the point position coordinates is matched with the measuring range of the first gantry mechanism, the point positions are not measured by the first gantry mechanism, the measuring head mechanisms on the first gantry mechanism employ predetermined safe coordinates; and in the step S302, when matching continues but none of the groups of the point position coordinates is matched with the measuring range of the second gantry mechanism, the point positions are not measured by the second gantry mechanism, the measuring head mechanisms on the second gantry mechanism employ predetermined safe coordinates.

12. The method as claimed in claim 10, wherein the step S60 further comprises:

determining whether the X-axis coordinates have been matched completely;

if yes, returning to the step S301;

if no, returning to the step S50 to continue allocating the X-axis coordinates not matched yet.

13. The method as claimed in claim 9, wherein the step S50 further comprises:

step S501 comprising according to a Y-axis coordinate of the first gantry mechanism, matching X-axis coordinates to the measuring head mechanisms disposed on the first gantry mechanism; and step S502 comprising according to a Y-axis coordinate of the second gantry mechanism, matching X-axis coordinates to the measuring head mechanisms disposed on the second gantry mechanism.

14. The method as claimed in claim 13, wherein the step S501 specifically comprises:

sequentially determining whether each of the point positions matched with the measuring head mechanisms on the first gantry mechanism is within a moving range set in corresponding one of the measuring head mechanisms;

if yes, matching the point position coordinate of the point position with corresponding one of the measuring head mechanisms for measurement;

if no, continuing matching until the point position coordinate of the point position is matched with the moving range set in the measuring head mechanisms; and the step S502 specifically comprises:

sequentially determining whether each of the point positions matched with the measuring head mechanisms on the second gantry mechanism is within a moving range set in corresponding one of the measuring head mechanisms;

if yes, matching the point position coordinate of the point position with corresponding one of the measuring head mechanisms for measurement;

if no, continuing matching until the point position coordinate of the point position is matched with the moving range set in the measuring head mechanism.

15. The method as claimed in claim 14, wherein in the step S501 and the step S502, when matching continues but none of the point position coordinates is matched with the moving ranges set in the measuring head mechanisms, the point positions are not measured by the measuring head mechanisms, and the measuring head mechanism employ predetermined safe coordinates.

16. The method as claimed in claim 9, wherein in the step S20, each of coordinate difference values among the point positions of each group is less than a limit value of the measuring head mechanisms on each gantry mechanisms along the Y-axis, and the limit value is ±2 millimeters (mm).

17. A multi-head measuring device, configured to measure heights of spacers on a surface of a color filter, wherein the device comprises:

a point position coordinates obtaining unit, configured to obtain point position coordinates for point positions on surface of the color filter that need measurement;

a grouping unit, configured to group the point position coordinates, wherein the point positions with a smallest difference of the Y-axis coordinates are grouped into a group for gantry mechanisms to measure the point positions simultaneously;

a Y-axis coordinate matching unit, configured to match the Y-axis coordinates of each group with the gantry mechanisms within a measuring range, wherein the two gantry mechanisms keep a safe distance therebetween; and an X-axis coordinate matching unit, configured to, according to the Y-axis coordinate of the gantry mechanisms, match measuring head mechanisms with the X-axis coordinates; wherein the matching X-axis coordinates fulfills that adjacent two of the measuring head mechanisms keep the safe distance.

\* \* \* \* \*